(12) United States Patent
Paci et al.

(10) Patent No.: US 11,772,452 B2
(45) Date of Patent: Oct. 3, 2023

(54) AIR CONDITIONING APPARATUS FOR RECREATIONAL VEHICLES

(71) Applicant: Dometic Sweden AB, Solna (SE)

(72) Inventors: Enrico Paci, Forlì (IT); Luca Alboni, Forlì (IT)

(73) Assignee: Dometic Sweden AB, Solna (SE)

( * ) Notice: Subject to any disclaimer, the term of this patent is extended or adjusted under 35 U.S.C. 154(b) by 404 days.

(21) Appl. No.: 16/763,459

(22) PCT Filed: Nov. 15, 2018

(86) PCT No.: PCT/IB2018/059001
§ 371 (c)(1),
(2) Date: May 12, 2020

(87) PCT Pub. No.: WO2019/097448
PCT Pub. Date: May 23, 2019

(65) Prior Publication Data
US 2020/0338951 A1     Oct. 29, 2020

(30) Foreign Application Priority Data
Nov. 16, 2017  (IT) .................. 102017000131339

(51) Int. Cl.
*B60H 1/00*  (2006.01)
*H02J 3/14*  (2006.01)

(52) U.S. Cl.
CPC ..... *B60H 1/00364* (2013.01); *B60H 1/00328* (2013.01); *B60H 1/00428* (2013.01);
(Continued)

(58) Field of Classification Search
CPC ............ B60H 1/00364; B60H 1/00428; B60H 1/00771; B60H 1/00371; B60H 1/00407;
(Continued)

(56) References Cited

U.S. PATENT DOCUMENTS 964,146 A    7/1910   Clark
RE24,637 E   4/1959   Wulle
(Continued)

FOREIGN PATENT DOCUMENTS

AU    3067405     3/2016
AU    201612249   5/2016
(Continued)

OTHER PUBLICATIONS

WO-9815790-A1; Published Apr. 1998; Aarestrup J (Year: 1998).*
(Continued)

*Primary Examiner* — Jenna M Hopkins
(74) *Attorney, Agent, or Firm* — Dinsmore & Shohl LLP (57) ABSTRACT

An air conditioning apparatus having at least a first heat exchanger for exchanging heat with air circulating there through; a cooling circuit for a cooling fluid, having a path that passes through the first heat exchanger; a compressor including an electric motor, for circulating the cooling fluid in the cooling circuit; an electrical power unit configured to absorb an input electrical current or power and to generate a variable infeed voltage, for powering the electric motor with an infeed electrical current, a controller connected to the electrical power unit, adapted to receive input data representative of a reference value for the input electrical current or power, and programmed to set the electrical power unit to generate the infeed voltage at a reference amplitude and/or frequency, so that the input electrical current or power is below the reference value.

19 Claims, 2 Drawing Sheets (52) U.S. Cl.
CPC ..... *B60H 1/00771* (2013.01); *B60H 1/00985* (2013.01); *H02J 3/14* (2013.01); *H02J 2310/46* (2020.01)

(58) Field of Classification Search
CPC .............. B60H 1/00414; B60H 1/3222; B60H 1/3216; B60H 2001/3292; B60H 2001/3272; F25B 49/022; F25B 49/025; F25B 2600/02; F25B 2600/021; F25B 2600/0252; F25B 2600/0253; F25B 13/00; F25B 30/00; F25B 30/02; F28B 2700/15; F28B 2700/151; F28B 2700/171; H02J 3/14; H02J 13/006; H02J 3/144; B60R 16/03
See application file for complete search history.

(56) References Cited

U.S. PATENT DOCUMENTS

| | | | |
|---|---|---|---|
| 2,973,795 A | 3/1961 | Wyman | |
| 3,092,009 A | 6/1963 | Goettl | |
| 3,115,082 A | 12/1963 | Sanoff | |
| 3,528,359 A | 9/1970 | Sand | |
| 3,680,468 A | 8/1972 | Schueler | |
| D226,381 S | 2/1973 | Harty | |
| 3,727,537 A | 4/1973 | Harty | |
| 3,867,486 A | 2/1975 | Nagele | |
| 3,974,755 A | 8/1976 | Honmann | |
| 4,189,987 A | 2/1980 | Berg et al. | |
| D257,637 S | 12/1980 | Armbruster | |
| 4,262,212 A | 4/1981 | Jacob et al. | |
| 4,346,755 A * | 8/1982 | Alley | F24F 11/46 236/78 D |
| 4,499,385 A | 2/1985 | Slavik | |
| 4,502,368 A | 3/1985 | Hempel | |
| 4,502,467 A | 3/1985 | Smith | |
| 4,502,888 A | 3/1985 | Leng et al. | |
| 4,550,648 A | 11/1985 | Eagle | |
| D284,025 S | 5/1986 | Armstrong | |
| 4,586,484 A | 5/1986 | Mossbach | |
| 4,590,917 A | 5/1986 | Mossbach | |
| 4,608,834 A | 9/1986 | Rummer | |
| 4,637,299 A | 1/1987 | Harding | |
| 4,641,502 A | 2/1987 | Aldrich et al. | |
| 4,646,535 A | 3/1987 | Matsuoka et al. | |
| 4,662,350 A | 5/1987 | Mossbach | |
| 4,665,804 A | 5/1987 | Muyasaka | |
| 4,672,818 A | 6/1987 | Roth | |
| 4,690,040 A | 9/1987 | Barnett | |
| 4,693,174 A | 9/1987 | Anderson | |
| 4,709,623 A | 12/1987 | Roth et al. | |
| D296,583 S | 7/1988 | Barradas | |
| 4,760,773 A | 8/1988 | Pezzulli | |
| D300,777 S | 4/1989 | Bales et al. | |
| D306,341 S | 2/1990 | Bales et al. | |
| 5,054,377 A | 10/1991 | Mochel et al. | |
| 5,056,262 A | 10/1991 | Schweiss et al. | |
| 5,176,570 A | 1/1993 | Leidl | |
| 5,214,918 A | 6/1993 | Oguni et al. | |
| D343,894 S | 2/1994 | Anderson | |
| 5,307,645 A | 5/1994 | Pannell | |
| 5,366,149 A | 11/1994 | Kline | |
| 5,374,215 A | 12/1994 | Crider et al. | |
| 5,403,183 A | 4/1995 | Andersson et al. | |
| D360,681 S | 7/1995 | Chopko | |
| 5,435,781 A | 7/1995 | Kitchens | |
| D367,524 S | 2/1996 | Waldschmidt et al. | |
| 5,494,244 A | 2/1996 | Walton | |
| 5,501,634 A | 3/1996 | Wilder | |
| 5,531,641 A | 7/1996 | Aldrich et al. | |
| 5,556,335 A | 9/1996 | Holyoake | |
| 5,568,732 A * | 10/1996 | Isshiki | G05D 23/1931 62/228.4 |
| 5,588,910 A | 12/1996 | Nutter et al. | |
| 5,632,156 A | 5/1997 | Takeo et al. | |
| 5,643,081 A | 7/1997 | Klein | |
| D391,632 S | 3/1998 | Thomas | |
| 5,727,998 A | 3/1998 | Kreuger et al. | |
| 5,752,877 A | 5/1998 | Sun | |
| 5,765,383 A | 6/1998 | Inoue | |
| 5,771,704 A * | 6/1998 | Nakajima | G05D 23/1917 62/230 |
| 5,860,856 A | 1/1999 | Teich et al. | |
| 5,863,310 A | 1/1999 | Brown et al. | |
| 5,964,910 A | 10/1999 | Keele | |
| D424,184 S | 5/2000 | Chang-Kwon | |
| 6,066,041 A | 5/2000 | Hernandez et al. | |
| 6,073,456 A | 6/2000 | Kawai et al. | |
| 6,076,370 A | 6/2000 | Da Silva | |
| D428,480 S | 7/2000 | Flanagan | |
| 6,101,829 A | 8/2000 | Robinson | |
| 6,149,513 A | 11/2000 | Lyu | |
| D435,639 S | 12/2000 | Slavonia et al. | |
| 6,171,062 B1 | 1/2001 | Bucher et al. | |
| D437,396 S | 2/2001 | Flanagan | |
| 6,196,914 B1 | 3/2001 | Lyu | |
| 6,234,893 B1 | 5/2001 | Meredith | |
| 6,241,794 B1 | 6/2001 | Jadran et al. | |
| 6,250,373 B1 | 6/2001 | Vecchi et al. | |
| 6,257,976 B1 | 7/2001 | Richardson, III | |
| 6,302,780 B1 | 10/2001 | Ahn et al. | |
| 6,339,934 B1 | 1/2002 | Yoon | |
| D454,625 S | 3/2002 | Flanagan | |
| 6,351,957 B2 | 3/2002 | Hara | |
| 6,357,249 B1 | 3/2002 | Robinson et al. | |
| 6,367,270 B2 | 4/2002 | Niimi et al. | |
| 6,370,899 B1 | 4/2002 | Hobbs et al. | |
| 6,370,906 B1 | 4/2002 | Kuo | |
| 6,415,622 B2 | 7/2002 | Kim et al. | |
| 6,536,222 B1 | 3/2003 | Ahn et al. | |
| 6,554,880 B1 | 4/2003 | Northcutt | |
| 6,571,572 B2 | 6/2003 | Hobbs et al. | |
| 6,601,356 B2 | 8/2003 | Snyder | |
| 6,616,523 B1 | 9/2003 | Tani et al. | |
| 6,626,003 B1 | 9/2003 | Kortum et al. | |
| 6,745,586 B1 | 6/2004 | Reimann et al. | |
| D495,041 S | 8/2004 | Thomas | |
| 6,814,660 B1 | 11/2004 | Cavett | |
| 6,857,953 B2 | 2/2005 | Malott | |
| 6,889,762 B2 | 5/2005 | Zeigler et al. | |
| D514,221 S | 1/2006 | Vladika | |
| 7,086,740 B2 | 8/2006 | Sample | |
| 7,140,192 B2 | 11/2006 | Allen et al. | |
| 7,171,822 B2 | 2/2007 | Allen et al. | |
| D538,413 S | 3/2007 | Lyu et al. | |
| 7,201,010 B2 | 4/2007 | Homan et al. | |
| D541,917 S | 5/2007 | Pfeiffer | |
| 7,234,315 B2 | 6/2007 | Allen et al. | |
| 7,237,397 B2 | 7/2007 | Allen | |
| D554,544 S | 11/2007 | Englert | |
| D560,785 S | 1/2008 | Galeazzi | |
| 7,316,119 B2 | 1/2008 | Allen | |
| 7,334,834 B2 | 2/2008 | Hill et al. | |
| 7,441,414 B2 | 10/2008 | Ziehr et al. | |
| 7,448,227 B2 | 11/2008 | Zeigler et al. | |
| 7,454,922 B2 | 11/2008 | Zeigler et al. | |
| 7,558,700 B2 | 7/2009 | Yamashita et al. | |
| 7,591,143 B2 | 9/2009 | Zeigler et al. | |
| 7,591,303 B2 | 9/2009 | Zeigler et al. | |
| 7,739,882 B2 * | 6/2010 | Evans | B60H 1/3222 236/51 |
| D619,151 S | 7/2010 | Tsuji | |
| D619,236 S | 7/2010 | Schlag et al. | |
| D619,960 S | 7/2010 | Winkler | |
| 7,797,958 B2 | 9/2010 | Alston et al. | |
| 7,832,221 B2 | 11/2010 | Wijaya et al. | |
| D629,094 S | 12/2010 | Thomas | |
| 7,845,187 B2 | 12/2010 | Patel et al. | |
| 7,851,098 B2 | 12/2010 | Schiegl et al. | |
| D636,474 S | 4/2011 | Choi et al. | |
| 7,934,387 B2 | 5/2011 | Lee et al. | |
| 7,963,117 B2 | 6/2011 | Allen et al. | |
| 8,015,833 B2 | 9/2011 | Cikanek et al. | |

(56) References Cited

U.S. PATENT DOCUMENTS

| | | |
|---|---|---|
| 8,096,482 B2 | 1/2012 | Dage |
| 8,113,047 B2 | 2/2012 | Volkwein et al. |
| D657,032 S | 4/2012 | Chouji |
| D657,033 S | 4/2012 | Chouji |
| D657,034 S | 4/2012 | Chouji |
| D657,036 S | 4/2012 | Vetu et al. |
| D657,857 S | 4/2012 | Choi |
| 8,171,866 B2 | 5/2012 | Dunstan |
| D661,386 S | 6/2012 | Bergin |
| 8,249,749 B2 | 8/2012 | Dage et al. |
| D672,450 S | 12/2012 | Milks et al. |
| 8,453,722 B2 | 6/2013 | Zeigler et al. |
| 8,535,127 B2 | 9/2013 | Malott |
| D691,059 S | 10/2013 | Fechner et al. |
| 8,568,209 B2 | 10/2013 | Boxum |
| D692,786 S | 11/2013 | Fechner et al. |
| D707,446 S | 6/2014 | Svahn |
| D709,604 S | 7/2014 | Qin et al. |
| D712,531 S | 9/2014 | Bergin |
| D715,907 S | 10/2014 | Bergin |
| D716,925 S | 11/2014 | Bergin |
| D717,719 S | 11/2014 | Sagen |
| 8,883,370 B2 | 11/2014 | Schiegl et al. |
| 8,915,317 B2 | 12/2014 | Aemisegger et al. |
| 8,989,941 B2 | 3/2015 | Aemisegger et al. |
| D726,295 S | 4/2015 | Kim et al. |
| 9,033,072 B2 | 5/2015 | Aemisegger et al. |
| D746,217 S | 12/2015 | Gruner |
| D751,184 S | 3/2016 | Farone et al. |
| D754,319 S | 4/2016 | Park et al. |
| 9,395,228 B2 | 7/2016 | Molitor et al. |
| D778,418 S | 2/2017 | Bu et al. |
| 9,577,570 B2 | 2/2017 | Thiel |
| D782,939 S | 4/2017 | Allard |
| 9,631,832 B2 | 4/2017 | Malott |
| D785,771 S | 5/2017 | Bergin et al. |
| D785,772 S | 5/2017 | Bergin et al. |
| D808,001 S | 1/2018 | Berkman et al. |
| D809,642 S | 2/2018 | Lee |
| D810,252 S | 2/2018 | Lee |
| D811,566 S | 2/2018 | Liu et al. |
| D811,568 S | 2/2018 | Terasaki et al. |
| D817,466 S | 5/2018 | Moseley |
| 9,975,405 B2 | 5/2018 | Siddiqui et al. |
| D824,387 S | 7/2018 | Oberpriller |
| D824,499 S | 7/2018 | Williamson et al. |
| 10,093,152 B2 | 10/2018 | Allard et al. |
| D832,987 S | 11/2018 | Bergin |
| D841,138 S | 2/2019 | Williamson et al. |
| D862,668 S | 10/2019 | Moseley |
| D865,926 S | 11/2019 | Moseley |
| D868,043 S | 11/2019 | Doe |
| D876,410 S | 2/2020 | Jeon et al. |
| D885,541 S | 5/2020 | Schumann |
| D895,096 S | 9/2020 | Brandenburg |
| D903,075 S | 11/2020 | Huang et al. |
| D905,217 S | 12/2020 | Hederstierna |
| D907,183 S | 1/2021 | Meda |
| D915,570 S | 4/2021 | Pellerin |
| D944,374 S | 2/2022 | Hederstierna et al. |
| 2001/0053668 A1 | 12/2001 | Berger |
| 2002/0170305 A1 | 11/2002 | Nakajima |
| 2003/0162492 A1 | 8/2003 | Caferro et al. |
| 2003/0220070 A1 | 11/2003 | Orendorff et al. |
| 2004/0005854 A1 | 1/2004 | Shin |
| 2004/0023089 A1 | 2/2004 | Schiegl |
| 2004/0038643 A1 | 2/2004 | Katagiri et al. |
| 2004/0072532 A1 | 4/2004 | Cho |
| 2005/0087332 A1 | 4/2005 | Umeo et al. |
| 2005/0227609 A1 | 10/2005 | Koessler |
| 2006/0026936 A1 | 2/2006 | Paumier et al. |
| 2006/0052050 A1 | 3/2006 | Malott et al. |
| 2006/0083889 A1 | 4/2006 | Schuckers |
| 2007/0000265 A1 | 1/2007 | McEnaney et al. |
| 2007/0032909 A1* | 2/2007 | Tolbert, Jr. ............ F25B 49/025 700/276 |
| 2007/0066215 A1 | 3/2007 | Song et al. |
| 2007/0131408 A1 | 6/2007 | Zeigler et al. |
| 2007/0157522 A1 | 7/2007 | Hebert et al. |
| 2007/0227693 A1 | 10/2007 | Allen et al. |
| 2007/0287374 A1 | 12/2007 | Day et al. |
| 2007/0299560 A1 | 12/2007 | LaHue et al. |
| 2008/0014852 A1 | 1/2008 | Mielke et al. |
| 2008/0029997 A1 | 2/2008 | Wickelmaier et al. |
| 2008/0034767 A1 | 2/2008 | Ziehr et al. |
| 2008/0146136 A1 | 6/2008 | Degutis et al. |
| 2008/0164850 A1 | 10/2008 | Ayana et al. |
| 2008/0314072 A1 | 12/2008 | Plank et al. |
| 2009/0098820 A1 | 4/2009 | Yabu |
| 2010/0089563 A1 | 4/2010 | Sundhar et al. |
| 2010/0224754 A1 | 9/2010 | Khan et al. |
| 2010/0288036 A1 | 11/2010 | Volkwein |
| 2011/0016894 A1 | 1/2011 | Lemon et al. |
| 2011/0067420 A1 | 3/2011 | Alston et al. |
| 2011/0302942 A1 | 12/2011 | Birchard |
| 2012/0210733 A1 | 8/2012 | Kolavennu et al. |
| 2012/0247131 A1 | 10/2012 | Esch |
| 2012/0324927 A1 | 12/2012 | Suzuki |
| 2013/0047648 A1 | 3/2013 | Zeigler et al. |
| 2013/0109294 A1 | 5/2013 | Tolinski et al. |
| 2013/0205811 A1 | 8/2013 | Esch |
| 2013/0328389 A1* | 12/2013 | Ayana ..................... H02J 9/00 307/9.1 |
| 2014/0033742 A1 | 2/2014 | Esch |
| 2014/0110186 A1 | 4/2014 | Aemisegger et al. |
| 2014/0188313 A1 | 7/2014 | Huang |
| 2014/0223928 A1 | 8/2014 | Esch |
| 2014/0260393 A1 | 9/2014 | Siddiqui et al. |
| 2015/0013781 A1 | 1/2015 | Wickelmaier et al. |
| 2015/0087216 A1 | 3/2015 | Stover et al. |
| 2015/0107814 A1 | 4/2015 | Jeong |
| 2015/0251521 A1 | 9/2015 | Brauer et al. |
| 2015/0352924 A1 | 12/2015 | Allard et al. |
| 2016/0076271 A1 | 3/2016 | Reinking |
| 2016/0207372 A1 | 7/2016 | Parry |
| 2017/0052054 A1 | 2/2017 | Merker et al. |
| 2017/0100985 A1 | 4/2017 | Johnson et al. |
| 2017/0203632 A1 | 7/2017 | Westendarp et al. |
| 2017/0210205 A1 | 7/2017 | Mosby |
| 2017/0241561 A1 | 8/2017 | Hoeflinger |
| 2017/0355246 A1 | 12/2017 | Mathe et al. |
| 2018/0017256 A1 | 1/2018 | Jaeger |
| 2018/0017285 A1 | 1/2018 | Armbruster et al. |
| 2019/0047353 A1 | 2/2019 | Williamson et al. |
| 2019/0047354 A1 | 2/2019 | Williamson et al. |
| 2019/0315197 A1 | 10/2019 | Williamson et al. |

FOREIGN PATENT DOCUMENTS

| | | |
|---|---|---|
| AU | 201613590 | 7/2016 |
| AU | 201613591 | 7/2016 |
| AU | 201613592 | 7/2016 |
| AU | 201613593 | 7/2016 |
| AU | 201712794 | 5/2017 |
| AU | 201712798 | 5/2017 |
| AU | 201911094 | 4/2019 |
| AU | 201912125 | 6/2019 |
| CA | 1011592 A | 6/1977 |
| CN | 103476613 A | 12/2013 |
| CN | 304097003 S | 4/2017 |
| DE | 1394024 U | 12/1936 |
| DE | 2613666 A1 | 10/1977 |
| DE | 69313696 T2 | 5/1998 |
| DE | 10140985 A1 | 3/2003 |
| DE | 10331044 B1 | 2/2005 |
| DE | 102007038716 A1 | 2/2009 |
| DE | 202009009910 U1 | 9/2009 |
| DE | 202011104885 U1 | 10/2011 |
| DE | 202012006081 U1 | 7/2012 |
| DE | 202012006084 U1 | 7/2012 |
| DE | 202012006085 U1 | 7/2012 |
| DE | 202012006086 U1 | 7/2012 |
| DE | 202012006087 U1 | 7/2012 |

(56) References Cited

FOREIGN PATENT DOCUMENTS

| | | |
|---|---|---|
| DE | 202012006089 U1 | 7/2012 |
| DE | 102011012089 A1 | 8/2012 |
| DE | 102011100182 A1 | 10/2012 |
| DE | 202013002717 U1 | 4/2013 |
| DE | 202013006209 U1 | 7/2013 |
| DE | 102012221424 A1 | 5/2014 |
| DE | 202011110687 U1 | 7/2015 |
| DE | 202014104787 U1 | 9/2015 |
| DE | 202016104120 U1 | 10/2017 |
| DE | 112018005883 T5 | 7/2020 |
| DE | 112020004382 T5 | 6/2022 |
| EM | 003323740-0001 | 7/2016 |
| EM | 003421643-0001 | 10/2016 |
| EP | 45491 B1 | 9/1983 |
| EP | 45946 B1 | 1/1984 |
| EP | 180053 A2 | 10/1985 |
| EP | 64769 B1 | 8/1986 |
| EP | 131872 B1 | 9/1987 |
| EP | 254760 B1 | 7/1990 |
| EP | 271783 B1 | 6/1991 |
| EP | 262546 B1 | 9/1991 |
| EP | 632237 B1 | 10/1997 |
| EP | 955529 A1 | 11/1999 |
| EP | 949455 B1 | 2/2002 |
| EP | 1079292 B1 | 5/2002 |
| EP | 1225090 A2 | 7/2002 |
| EP | 967435 B1 | 8/2003 |
| EP | 1386883 A1 | 2/2004 |
| EP | 926453 B1 | 4/2004 |
| EP | 1449690 A1 | 8/2004 |
| EP | 976990 B1 | 9/2004 |
| EP | 936420 B1 | 2/2005 |
| EP | 967436 B1 | 8/2005 |
| EP | 1108963 B1 | 9/2005 |
| EP | 1614559 A1 | 1/2006 |
| EP | 0921361 B1 | 2/2006 |
| EP | 1621818 A1 | 2/2006 |
| EP | 855556 B1 | 5/2006 |
| EP | 1130338 B1 | 5/2006 |
| EP | 1156277 B1 | 6/2006 |
| EP | 1681517 A1 | 7/2006 |
| EP | 1693623 A1 | 8/2006 |
| EP | 1681191 A3 | 5/2007 |
| EP | 1826041 A1 | 8/2007 |
| EP | 1832452 A2 | 9/2007 |
| EP | 1840459 A1 | 10/2007 |
| EP | 1848057 A1 | 10/2007 |
| EP | 1892473 A2 | 2/2008 |
| EP | 1714858 B1 | 3/2008 |
| EP | 1748188 B1 | 9/2008 |
| EP | 1702835 B1 | 12/2008 |
| EP | 1693095 B1 | 1/2009 |
| EP | 1816411 A3 | 2/2009 |
| EP | 1834564 A3 | 4/2009 |
| EP | 2051006 A1 | 4/2009 |
| EP | 2110614 A1 | 10/2009 |
| EP | 1886905 B1 | 3/2010 |
| EP | 2096340 B1 | 7/2010 |
| EP | 2208661 A1 | 7/2010 |
| EP | 1623858 B1 | 9/2010 |
| EP | 1752365 B1 | 9/2010 |
| EP | 1826041 B1 | 10/2010 |
| EP | 2138386 B1 | 6/2011 |
| EP | 2116771 B1 | 8/2011 |
| EP | 2357899 A1 | 8/2011 |
| EP | 2361947 A1 | 8/2011 |
| EP | 1788320 B1 | 1/2012 |
| EP | 2409903 A1 | 1/2012 |
| EP | 1714859 B2 | 4/2012 |
| EP | 1703355 B1 | 5/2012 |
| EP | 2131172 B1 | 5/2012 |
| EP | 1848058 B1 | 10/2012 |
| EP | 1688656 B1 | 12/2012 |
| EP | 2559978 A1 | 2/2013 |
| EP | 2028419 A3 | 6/2013 |
| EP | 2200114 B1 | 10/2013 |
| EP | 2629273 A3 | 12/2013 |
| EP | 2669124 A1 | 12/2013 |
| EP | 2669154 A2 | 12/2013 |
| EP | 2669155 A2 | 12/2013 |
| EP | 2722203 A1 | 4/2014 |
| EP | 2722215 A2 | 4/2014 |
| EP | 2722219 A2 | 4/2014 |
| EP | 2722262 A2 | 4/2014 |
| EP | 2722263 A2 | 4/2014 |
| EP | 2723044 A1 | 4/2014 |
| EP | 2527173 B1 | 10/2014 |
| EP | 2354653 B1 | 11/2014 |
| EP | 2551173 B1 | 3/2015 |
| EP | 2439434 B1 | 7/2015 |
| EP | 2423019 B1 | 8/2015 |
| EP | 2910457 A1 | 8/2015 |
| EP | 2918483 A2 | 9/2015 |
| EP | 2214239 B1 | 11/2015 |
| EP | 2413409 B1 | 11/2015 |
| EP | 2423013 B1 | 11/2015 |
| EP | 2290290 B1 | 12/2015 |
| EP | 2508397 B1 | 3/2016 |
| EP | 3006863 A1 | 4/2016 |
| EP | 3081463 A1 | 10/2016 |
| EP | 3121042 A1 | 1/2017 |
| EP | 3128299 A1 | 2/2017 |
| EP | 3163741 A1 | 5/2017 |
| EP | 3165433 A1 | 5/2017 |
| EP | 3315880 A1 | 5/2018 |
| FR | 2087220 A7 | 12/1971 |
| FR | 2825325 A1 | 12/2002 |
| GB | 2297157 A | 7/1996 |
| GB | 2553972 A | 3/2018 |
| IN | 52/2017 A | 12/2017 |
| IT | 1314776 B1 | 1/2003 |
| IT | AP20030006 A1 | 2/2005 |
| IT | 1343133 B | 11/2007 |
| IT | MO20060143 A1 | 11/2007 |
| IT | RM20080283 A1 | 8/2008 |
| IT | RM20080282 A1 | 11/2009 |
| IT | PD20090020 A1 | 8/2010 |
| IT | BO20090180 A1 | 9/2010 |
| IT | MO20090109 A1 | 11/2010 |
| IT | PI20110130 A1 | 5/2013 |
| JP | S52137854 A | 11/1977 |
| JP | 2001180254 A | 7/2001 |
| JP | 2004-125338 A | 4/2004 |
| KR | 10-2005-0119747 A | 12/2005 |
| WO | 1992020975 A1 | 11/1992 |
| WO | 9965554 A1 | 12/1999 |
| WO | 200211221 A2 | 2/2002 |
| WO | 2004099681 A1 | 11/2004 |
| WO | 2005108882 A2 | 11/2005 |
| WO | 2006025880 A2 | 3/2006 |
| WO | 2007014721 A1 | 2/2007 |
| WO | 2008154975 A1 | 12/2008 |
| WO | 2011076355 A1 | 6/2011 |
| WO | 2012119743 A1 | 9/2012 |
| WO | WO-2012138497 A1 * | 10/2012 ......... B60H 1/00364 |
| WO | 2013119489 A2 | 8/2013 |
| WO | 2015191029 A1 | 12/2015 |
| WO | 2017032698 A1 | 3/2017 |
| WO | 2017087628 A1 | 5/2017 |
| WO | 2017108289 A1 | 6/2017 |
| WO | 2019097448 A1 | 5/2019 |
| WO | WO-2019097448 A1 * | 5/2019 ......... B60H 1/00328 |

OTHER PUBLICATIONS

Restriction Requirement dated Apr. 13, 2020, received for Design U.S. Appl. No. 29/682,265, filed Mar. 4, 2019.
Italian App. No PG2014A000058 filed Dec. 2, 2014 titled Rotary Device for Reconfiguring Microwave Components in Cavity or Waveguide.
Italian Search Report and Written Opinion for Italian Application No. IT201900014247 dated Apr. 14, 2020.

(56) References Cited

OTHER PUBLICATIONS

Truma., "Aventa Comfort (Australia) Operating Instructions Installation Instructions," 2013, pp. 1-16.
German Application No. 102020209854.9 filed on Aug. 5, 2020.
Notice of Allowance in Design U.S. Appl. No. 29/682,265 dated Aug. 10, 2020.
Notice of Allowance in Design U.S. Appl. No. 29/604,433 dated Aug. 14, 2020.
Notice of Allowance in Design U.S. Appl. No. 29/682,265 dated Aug. 28, 2020.
Notice of Allowance in Design U.S. Appl. No. 29/604,433 dated Sep. 18, 2020.
Notice of Allowance in Design U.S. Appl. No. 29/682,265 dated Oct. 23, 2020.
Notice of Allowance in Design U.S. Appl. No. 29/604,433 dated Nov. 17, 2020.
Notice of Allowance in Design U.S. Appl. No. 29/604,433 dated Nov. 30, 2020.
Design U.S. Appl. No. 29/760,605, filed Dec. 2, 2020.
U.S. Appl. No. 17/252,506, filed Dec. 15, 2020.
U.S. Appl. No. 63/141,800, filed Jan. 26, 2021.
Design U.S. Appl. No. 29/767,929, filed Jan. 26, 2021.
Design U.S. Appl. No. 29/774,535, filed Mar. 17, 2021.
U.S. Appl. No. 17/205,719, filed Mar. 18, 2021.
U.S. Appl. No. 63/175,304, filed Apr. 15, 2021.
Australian Patent Application No. 2018366469 titled "Air Conditioning Apparatus for Recreational Vehicles" Filed on May 6, 2020.
Chinese Patent Application No. 201880073547 titled "Air Conditioning Apparatus for Recreational Vehicles" filed on May 13, 2020.
Italian Search Report and Written Opinion for Italian Application No. 102019000019193 dated Jun. 26, 2020.
International Search Report Issued in PCT Application No. PCT/IB2020/059701 dated Nov. 30, 2020.
PCT Application No. PCT/IB2020/059701 titled "Air Conditioning Apparatus for Recreational Vehicles" filed on Oct. 15, 2020.
Notice of Allowance in Design U.S. Appl. No. 29/760,605 dated May 26, 2021.
Notice of Grant Issued in Italian Application No. 102017000131339 dated Feb. 5, 2019.
Notice of Allowance in Design U.S. Appl. No. 29/760,605 dated Jul. 22, 2021.
Notice of Grant Issued in Italian Application No. IT102019000014247 dated Jul. 29, 2021.
Corrected Notice of Allowance in Design U.S. Appl. No. 29/760,605 dated Aug. 18, 2021.
Corrected Notice of Allowance in Design U.S. Appl. No. 29/760,605 dated Sep. 1, 2021.
U.S. Appl. No. 17/768,781, filed Apr. 13, 2022.
Australian Patent Application No. 2020365568 filed on Mar. 31, 2022.
German Patent Application No. 11202004382.7 filed on Apr. 13, 2022.
Notice of Grant Issued in Italian Application No. 102019000019193 dated Sep. 27, 2021.
Notice of Allowance in Design U.S. Appl. No. 29/760,605 dated Oct. 14, 2021.
Corrected Notice of Allowance in Design U.S. Appl. No. 29/760,605 dated Oct. 28, 2021.
European Patent Office, International Search Report and Written Opinion for PCT/IB2018/059001 dated Feb. 13, 2019, 9 pages.
Office Action Issued in German Application No. 112018005883.2 dated Feb. 8, 2022.
10-Minute Tech, Trailer Life, Jul. 1996, pp. 69-70 dated Jul. 1, 1996.
"American RV Company, Dometic 459530 Duo Therm 13,500 BTU Brisk Air Conditioner High Efficiency Upper Unit Trailer Camper RV, Mar. 23, 2014, https://web.archive.org/web/20140323013456/http://www.americanrvcompany.com/Dometic459530-Duo-Therm-13500-BTU-Brisk-Air-Conditioner-High-Efficiency-Upper-Unit-Trailer-Camper-RV Mar. 23, 2014".
"American RV Company, Dometic 541815 High Performance 13,500 BTU Air Conditioner Upper Unit CCC2 Required Electronics Pre-Installed Camper Trailer RV,https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014".
American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.
Dirna Bergstrom: Parking Coolers—No Idle Electrical A/C—MiniCool Compact 1.4; http://www.dirna.com/parking-coolers-no-idle-electrical-ac-compact/ Mar. 17, 2015.
Dirna Bergstrom: Slim Cool; http://www.dima.com/files/dirna-manuals/220RE00183.pdf May 21, 2014.
Dometic Corporation, Dometic High Performance Air Conditioners, 2 pages, Jan. 1, 2011.
Dometic Group: "Climate Control", http://www.dometic.com/enus/Americas/USA/RV-Products/climate, 2 pages, Dec. 14, 2011.
Dometic Waeco Coolair RT 880; http://www.dometic.co.uk/product/waeco-coolair-rt-880-2/ May 14, 2015.
Eberspacher Cooltronic Parking Coolers with High Efficiency with the Engine Off; http://www.eberspacher.com/products/air-conditioning/cooltronic-truck-parking-coolers html Jun. 23, 2015.
Indelb; WO Oblo; Sleeping Well Oblo; http://www.indelb.com/products/parking_air_cooler/sleeping_well/sw_oblo Apr. 1, 2016.
Webasto: Rooftop air conditioning systems: Rooftop 3.5-9.9 kw; https://web.archive.org/web/20161201014045/https://www.webasto.com/au/markets-products/off-highway/air-conditioning/rooftop-air-conditioning/rooftop-ac-35-99-kw/, Apr. 12, 2019.
Webasto; Truck parking cooler: Cool Top Vario 10 E; http://www.webasto.com/gb/marketsproducts/truck/air-conditioning/products/cool-top-vario/ Apr. 25, 2016.
Youtube; Viesa Kompressor; https://www.youtube.com/watch?v=SPK17XEvVLO May 22, 2012 (https://www.google.com/?gws_rd=ssl#q=https://www.youtube.com/watch?v%3DSPK17XEWVL0&spf=1495819902591) International Search Report and Written Opinion for PCT/US2013/065458 dated Jan. 29, 2014.
International Search Report and Written Opinion for PCT/US2013/065458 dated Jan. 29, 2014.
EU Design Patent Application No. 000965843-0001-000965843-0004 filed on Jul. 7, 2008.
EU Design Patent Application No. 000990270-0001-000990270-0003 filed on Aug. 22, 2008.
EU Design Patent Application No. 001662826-0001-001662826-0005 filed on Jan. 29, 2010.
EU Design Patent Application No. 001765082-0001-001765082-0002 filed on Oct. 7, 2010.
EU Design Patent Application No. 001906751-0001-001906751-0024 filed on Aug. 22, 2011.
EU Design Patent Application No. 001964909-0001-001964909-0018 filed on Dec. 19, 2011.
EU Design Patent Application No. 001966136-0001-001966136-0004 filed on Dec. 21, 2011.
EU Design Patent Application No. 002081919-0001-002081919-0002 filed on Jul. 31, 2012.
EU Design Patent Application No. 002088500-0001-002088500-0004 filed on Aug. 16, 2012.
Design U.S. Appl. No. 29/660,094, filed Aug. 17, 2018.
Design U.S. Appl. No. 29/620,394, filed Oct. 4, 2017.
Design U.S. Appl. No. 29/645,887, filed Apr. 30, 2018.
U.S. Appl. No. 62/819,711, filed Mar. 18, 2019.
U.S. Appl. No. 29/677,547, filed Jan. 22, 2019.
U.S. Appl. No. 16/744,584, filed Jan. 16, 2020.
Dometic Product Catalog, Climate Control, 2015.
Dometic Product Catalog, Climate Control, 2016.

(56) References Cited

OTHER PUBLICATIONS

Italian Application No. 102019000019193 filed on Oct. 17, 2019.
Restriction Requirement dated Apr. 13, 2020, received for Design U.S. Appl. No. 29/604,433, filed May 17, 2017.
Canadian Intellectual Property Office, Office Action for App. No. 167431 dated Oct. 8, 2016.
Italian Application No. 102017000131339 filed Nov. 16, 2017.
Office Action Issued in German Application No. 102020209854.90 dated Aug. 10, 2022.
Office Action Issued in German Application No. 102020209854.90 dated Dec. 16, 2022.
Decision to Grant Issued in German Application No. 102020209854.90 dated Jan. 26, 2023.
Office Action issued in CN Application No. 201880073547.0 dated Mar. 6, 2023.
Patent Certificate Issued in German Application No. 102020209854.90 dated May 4, 2023.

\* cited by examiner

AIR CONDITIONING APPARATUS FOR RECREATIONAL VEHICLES

TECHNICAL FIELD

Present embodiments relate to an air conditioning apparatus for recreational vehicles; moreover, the present embodiments relate to a recreational vehicle and to a method for supplying conditioned air in a recreational vehicle.

BACKGROUND ART

Air conditioning apparatuses for recreational vehicles usually comprise a cooling circuit for a cooling fluid, a condenser, an expansion device, an evaporator, a compressor and an electric motor for driving the compressor.

In recreational vehicles, variable frequency compressors are known. For example, the patent document US2002170305 discloses a variable frequency compressor whose operation frequency is controlled by a control device, in dependency on a compressor current, detected at the electric motor, and on a rotational speed of a drive shaft of the electric motor, in order to let the compressor reach his target rotational speed, thus preventing damages to the compressor or to other components due to liquid compression.

However, in recreational vehicles applications, the total available current is limited by the ampacity of the electrical circuit of the campsite, thus, if no specific solution is provided, the user must turn off the air conditioning system, if there is not enough current to operate the compressor. Alternatively, the user needs to decide whether to turn off the air conditioning system or other energy consuming facilities, such as a fridge or a boiler, in order to avoid that the incoming power limitations are exceeded. Therefore, it would be necessary to arrange on the recreational vehicle a plurality of compressors with different sizes, in order to suit all the possible ampacity of the power supply.

The patent document EP1826041 is directed to a variable speed control system for heating and cooling systems in recreational vehicles where the frequency of the compressor is controlled in dependency on the user's demand in cooling or heating; in this solution, a current limiting device (e.g. an electrical contact or a dipswitch) is provided in order to limit the output of the compressor based on a maximum allowable ampacity of the external power supply (e.g. the electrical circuit of the campsite). However, the control of the compressor based on the maximum allowable ampacity is by steps, thus has a limited flexibility: for example, if the maximum power of the compressor is not compatible with the ampacity of the power supply, the compressor output is limited to a value given by the first circuit breaker's step compatible with the power supply. Other examples of electrical power management systems in air conditioners for recreational vehicles are provided in patent documents U.S. Pat. Nos. 4,499,385, 4,262,212 and US2008/0164850. An example of a compressor driving device in an air conditioner is provided in patent document EP3163741A1. However, these documents leave unsatisfied the need to improve the flexibility of the air conditioner to adjust its functioning responsive to the power supply.

SUMMARY

Present embodiments provide an air conditioning apparatus for recreational vehicles, which overcomes the limits of the prior art as mentioned above. This scope is achieved by the air conditioning apparatus of one or more of the appended claims.

In particular, the present disclosure has for an aim to achieve the best possible performance of a compressor of an air conditioning system, dependent on the actual available power supply. In other words, an aim is to maximize the rotational speed of the drive shaft of the compressor, compatibly with the maximum power supply available, which depends on the location.

Also, the present embodiments is to achieve different operation modes (chosen by the user) in a way that is optimized with respect to the input power supply.

This disclosure also covers a recreational vehicle and a method for supplying air conditioning in a recreational vehicle.

According to one aspect of the present description, the air conditioning apparatus comprises a cooling circuit for a cooling fluid. In an embodiment, the cooling fluid is a refrigerant. In an embodiment, the cooling circuit is a refrigerator circuit.

The air conditioning apparatus (in the following, the apparatus) comprises a first heat exchanger. The cooling circuit has a path that passes through said first heat exchanger. The first heat exchanger is configured for exchanging heat with air circulating there through.

The first heat exchanger, in an embodiment, is an evaporator, configured to evaporate the cooling fluid passing there through. In an embodiment, the cooling fluid passing through the evaporator absorbs heat from the air circulating through the evaporator, resulting in an evaporation of the cooling fluid and in a cooling of the air (thus becoming air conditioned).

The first heat exchanger, in another embodiment, is a condenser, configured to condensate the cooling fluid passing there through. In an embodiment, the cooling fluid passing through the condenser releases heat to the air circulating through the condenser, resulting in a condensation of the cooling fluid and in a heating of the air.

In an embodiment, the first heat exchanger is suitable to operate both as a condenser and as an evaporator, in dependence on the direction of the cooling fluid passing there through.

The heating apparatus comprises a compressor. The compressor is connected to the cooling circuit for circulating the cooling fluid in the cooling circuit. The compressor includes an electric motor.

The heating apparatus includes an electrical power unit. The electrical power unit is configured to absorb an input electrical current (or power) and to generate a variable infeed voltage, for powering the electric motor with an infeed electrical current. In an embodiment, the variable infeed voltage is alternate. The input electrical current (or power) is fed by an external power supply (e g. the power supply of a campsite).

In an embodiment, the electrical power unit is an inverter. The inverter is configured to generate the variable infeed voltage for powering the electric motor with the infeed current at an infeed frequency.

In an embodiment, the electrical power unit is configured for powering the compressor with a plurality of different frequencies; in an embodiment, the infeed frequency (at which the compressor is powered) is selectable (among said plurality of frequencies) by the user, through an interrupter. In an embodiment, the infeed frequency is automatically selectable (among said plurality of frequencies) in dependence on the external power supply and the power demand at the compressor.

The electrical power unit is capable of powering the electric motor of the compressor with a wide range of voltages, in dependence on the available power supply. Thus, the electrical power unit is universal for every kind of external power supply, and in the meantime suitable to power a unique compressor with different voltages in dependence on the external power supply.

The heating apparatus comprises a controller. The controller is connected to the electrical power unit. The controller is adapted (or programmed) to receive input data representative of a reference value for the input electrical power or current. The reference value for the input electrical power or current depends on the power supply of the campsite, thus on the location and/or the contract with the campsite signed by the user. Also, the controller is programmed to set the electrical power unit to generate the infeed voltage at a reference amplitude and/or frequency, so that the input electrical current is below said reference value.

Thus, the electric motor powered by the infeed electric current will drive the compressor in an optimized way, accordingly to the reference value for the input electrical power or current. Therefore, with only one compressor it is possible to suit all the values for the input electrical current or power.

The air conditioner of the present disclosure allows the producer to define a platform, that is a range of air conditioning apparatuses having different size (power), wherein the apparatuses of different sizes share the same hardware and differ in the software programmable setting data memorized in the self-same apparatuses.

In an embodiment, the electric motor includes a first drive shaft. In an embodiment, the compressor includes a second drive shaft. The first drive shaft (of the electric motor) is connected to the second drive shaft (of the compressor). The electric motor is configured for driving the compressor through rotating the first drive shaft (of the electric motor), that causes a rotation of the second drive shaft (of the compressor).

The rotational speed of the first drive shaft (of the electric motor) will depend on the infeed voltage generated by the electrical power unit. Provided that the controller receives the input data, it is configured to adapt infeed voltage to assure that the incoming power restrictions (depending on the campsite) are not exceeded, optimizing at the same time the power absorption of the electric motor accordingly to the power restrictions.

In an embodiment, the apparatus comprises an interface. The interface is connected to the controller. The interface is configured to enable a user to provide the input data through the interface. The interface could be for example a touch screen interface, a keyboard, or simply one or more buttons. In this embodiment, the user himself provides the apparatus with the information regarding the power limitations (related to the campsite), through said interface.

In an embodiment, the apparatus comprises a positioning device. The positioning device is configured for determining the position of the apparatus in space. In an embodiment, the positioning device is connectable to an external receiver for providing geolocation and/or time information to the external receiver. The positioning device can be implemented in any way that allows to determine the position of the apparatus in space. In the following, some non-limiting examples of possible ways to implement the positioning device are provided.

In an embodiment, the positioning device includes (or is) a GPS positioning device (with the acronym GPS, Global Positioning System is meant). The GPS positioning device is a satellite-based device. The GPS positioning device is configured for providing geolocation and/or time information to an external receiver located on a satellite. In an embodiment, the apparatus comprises a memory containing a plurality of reference values matched with a corresponding plurality of locations. In an embodiment, the controller is adapted to receive a location signal from the GPS positioning device. In an embodiment, the controller is programmed to set as the input data one of the reference values present in the memory, as a function of the location signal. In this embodiment, the apparatus itself understands in which campsite it is, and optimizes the power absorption of the electric motor accordingly to the power restrictions in force in that campsite.

Other satellite-based positioning devices (further to the GPS) are provided by the present disclosure. In an embodiment, the positioning device includes (or is) a GLONASS positioning device (Global Navigation Satellite System), which is a space-based satellite navigation system alternative to the GPS. In an embodiment, the positioning device includes (or is) a Galileo Global Navigation satellite system.

In an embodiment, the positioning device includes (or is) a network-based positioning device (or radio-based positioning device). The network-based positioning device is configured for providing geolocation and/or time information to a land-based external receiver. For example, a network-based positioning device may be of LORAN (Long Range Navigation) type.

In an embodiment, the apparatus comprises both the interface and the positioning device (satellite or network-based) with the memory: in case the positioning device is not able to exactly identify a campsite, the user may set the input data through the interface.

In an embodiment, the apparatus comprises a signal receiver.

In an embodiment, the signal receiver is a wireless signal receiver. In another embodiment, the signal receiver is a wired-connected signal receiver.

The signal receiver is connected (through a wireless connection or a wired connection) to the controller for transmitting the input data. In an embodiment, the signal receiver is connected to the interface and to the controller, for transmitting the input data from the interface to the controller. In an embodiment, the signal receiver is connected to the positioning device (satellite or network based) and to the controller, for transmitting the location signal from the positioning device (satellite or network based) to the controller.

In an embodiment, the apparatus comprises a temperature set point interface. Through the temperature set point interface, the user is able to select a desired indoor temperature. In an embodiment, the set point interface is connected to the controller. In an embodiment, the apparatus comprises an indoor temperature sensor. In an embodiment, the indoor temperature sensor is connected to the controller. In an embodiment, the apparatus comprises an outdoor temperature sensor. In an embodiment, the outdoor temperature sensor is connected to the controller.

In an embodiment, the controller is configured to receive a signal representative of the temperature set point, set by the user. In an embodiment, the controller is configured to receive a signal representative of the indoor temperature, measured by the indoor temperature sensor. In an embodiment, the controller is configured to receive a signal representative of the outdoor temperature, measured by the outdoor temperature sensor.

In an embodiment, the controller is programmed to set the electrical power unit to generate the infeed voltage as a function of one or more of the following parameters: the input data, the temperature set point, the indoor temperature, the outdoor temperature.

In an embodiment, the apparatus comprises at least one of a condensing fan or an evaporating fan. The at least one of the condensing fan or evaporating fan is operatively active on the air circulating through the first heat exchanger.

In an embodiment, the controller is programmed to drive at least one of the condensing fan and the evaporating fan, as a function of the input data. In an embodiment, the controller is programmed to drive at least one of the condensing fan and the evaporating fan, so that the overall input electrical current or power absorbed by the electrical power unit is below said reference value.

In an embodiment, the condensing fan and/or the evaporating fan are fed with a variable voltage. In an embodiment, the condensing fan and/or the evaporating fan are fed with a direct voltage.

In an embodiment, the apparatus includes a second heat exchanger. The cooling circuit, in an embodiment, has a path that passes through said second heat exchanger. The second heat exchanger is arranged in the path of the cooling fluid.

The second heat exchanger, in an embodiment, is an evaporator. The second heat exchanger, in an embodiment, is a condenser.

In an embodiment, the second heat exchanger is suitable to operate both as a condenser and as an evaporator, in dependence on the direction of the cooling fluid passing there through.

In some embodiments, the first heat exchanger is an evaporator, and the second heat exchanger is a condenser. In this embodiment, the apparatus is suitable for cooling purposes.

In another embodiment, the first heat exchanger is a condenser, and the second heat exchanger is an evaporator. In this embodiment, the apparatus is suitable for heating purposes.

In an embodiment, the apparatus comprises a four-way valve for changing the direction of the cooling fluid in the cooling circuit, in order to change the apparatus mode from a cooling mode to a heating mode, and vice versa.

In a preferred embodiment, the apparatus comprises a condensing fan and an evaporating fan. In an embodiment, the condensing fan is configured for circulating air through the second heat exchanger. In an embodiment, the evaporating fan is configured for circulating air through the first heat exchanger.

In an embodiment, the controller is programmed to drive the condensing fan and the evaporating fan as a function of the input data. In an embodiment, the controller is programmed to drive the condensing fan and the evaporating fan, so that the overall input electrical current or power absorbed by the electrical power unit is below said reference value. Thus, the programmer is configured to drive the condensing fan and to evaporating fan accordingly to the compressor, in dependence on the ampacity of the power supply.

According to one aspect of the present disclosure, the air conditioning apparatus is self-contained; in other words, the present disclosure regards a self-contained air conditioner. In this disclosure, the expression "self-contained" means that the apparatus includes both the condenser and the evaporator as well as fans to push air.

In an embodiment, the memory contains for each value of a plurality of reference values for the infeed current, a corresponding plurality of predetermined settings for the compressor and for at least one of the condensing fan and the evaporating fan. In an embodiment, said settings include the speed of the compressor and the speed of at least one of the condensing fan and the evaporating fan. In an embodiment, said settings include the speed of the compressor, the speed of the condensing fan and the speed of the evaporating fan. In an embodiment, the controller is programmed to receive a user selected operation-mode parameter, and to select, for each reference value, one setting out of said plurality of predetermined settings, as a function of the operation-mode parameter.

The operation-mode parameter is representative of an operation mode selectable by the user, such for example a sleep-operation mode or a boost-operation mode. The operation-mode parameter is representative of predetermined logics as a function of which the controller drives the apparatus' components. When the sleep operation mode is selected, the controller selects predetermined settings out of said plurality of predetermined settings, in order to minimize the noise emitted by the condensing fan and the evaporating fan. When the boost operation mode is selected, the controller selects predetermined settings out of said plurality of predetermined settings, in order to maximize the power supplied to the compressor, also over its nominal power, compatibly with the power supply from the campsite.

In an embodiment, the memory contains, for each value of the plurality of reference values for the infeed current, at least a first setting, corresponding to a first speed of the compressor and of the at least one of the condensing fan and the evaporating fan, and a second setting, corresponding to a second speed of the compressor and of the at least one of the condensing fan and the evaporating fan. In an embodiment, the second speed is higher than then first speed.

In an embodiment, the memory contains, for each value of the plurality of reference values for the infeed current, at least a first setting, corresponding to a first speed of the compressor, of the condensing fan and of the evaporating fan, and a second setting, corresponding to a second speed of the compressor and of the condensing fan and the evaporating fan. In an embodiment, the second speed is higher than then first speed.

In an embodiment, the memory contains, for each value of the plurality of reference values for the infeed current, a plurality of settings, each one corresponding to a respective speed of the compressor, of the condensing fan and of the evaporating fan.

In an embodiment, the apparatus comprises an electric supply component. The electric supply component has an input terminal. The input terminal is connectable to an external power supply. The input terminal is adapted to receive a wide range of input voltages. In an embodiment, the input voltage is in a range between 85 V and 265 V. The input terminal is adapted to receive a wide range of input frequencies. In an embodiment, the input frequency is 50 Hz. In an embodiment, the input frequency is 60 Hz. The input terminal is adapted to receive a wide range of input electrical currents. In an embodiment, the input electrical current is 3 A. In an embodiment, the input electrical current is 5 A. In an embodiment, the input electrical current is 10 A.

The electric supply component has an output terminal. In an embodiment, the electric supply component has an output at 400V DC.

In an embodiment, the output terminal is connected to the electrical power unit. In an embodiment, the output terminal is connected to the controller. The electric supply component is configured to generate a predetermined direct voltage at the output terminal, independently on frequency and amplitude of the voltage of the external power supply. In an embodiment, the electric supply component is a rectifier.

In an embodiment, the apparatus comprises a first converter. The first converter has an input connected to the output of the electric supply component and an output connected to the controller, for powering the controller.

In an embodiment, the first converter is a DC/DC converter, for powering the controller with a direct current. In an embodiment, the first converter is a voltage elevator circuit. In an embodiment, the first DC/DC converter is a voltage lowering circuit. In an embodiment, the first converter is an inverter, for powering the controller with a variable current.

In an embodiment, the apparatus comprises a second converter. The second converter has an input connected to the output of the electric supply component and an output connected to the evaporating fan, for powering the evaporating fan.

In an embodiment, the second converter is a DC/DC converter, for powering the evaporating fan with a direct current. In an embodiment, the second DC/DC converter is a voltage elevator circuit. In an embodiment, the second DC/DC converter is a voltage lowering circuit. In an embodiment, the second converter is an inverter, for powering the evaporating fan with a variable current.

In an embodiment, the apparatus comprises a third converter. The third converter has an input connected to the output of the electric supply component and an output connected to the condensing fan, for powering the condensing fan. In an embodiment, the third converter is a DC/DC converter, for powering the condensing fan with a variable current. In an embodiment, the third DC/DC converter is a voltage elevator circuit. In an embodiment, the third DC/DC converter is a voltage lowering circuit. In an embodiment, the third converter is an inverter, for powering the condensing fan with a variable current.

In an embodiment, the apparatus comprises a programmable memory. In an embodiment, the programmable memory is connected to the controller. In an embodiment, the input data are predetermined and memorized in said memory. In an embodiment, the interface is configured to enable the user to select the input data among a plurality of predetermined values memorized in the programmable memory. In an embodiment, the programmable memory contains the plurality of reference values match with the corresponding plurality of locations.

The present description also covers a method for supplying conditioned air in a recreational vehicle.

In an embodiment, the method comprises a step of circulating a cooling fluid. The circulation of the cooling fluid is actuated by means of a compressor. The compressor includes an electric motor. The cooling fluid circulates in a cooling circuit.

In an embodiment, the method comprises a step of exchanging heat between the cooling fluid and air.

In an embodiment, the method comprises a step of generating a variable voltage. The generation of the variable infeed voltage is carried out by means of an electrical power unit, which is fed with an input current or power. The variable infeed voltage is generated for powering the electric motor with an infeed electrical current.

In an embodiment, a controller sets the electrical power unit to generate the variable voltage at a reference amplitude and/or frequency selected so that the absorbed input current or power is below a reference value, in response to input data accessible from the controller.

In an embodiment, the controller receives the input data through an interface operable by a user. In an embodiment, the controller receives the input data through a wireless signal received at a receiver.

In an embodiment, the controller receives a location signal from a positioning device (satellite or network based). In an embodiment, the controller selects a reference value for the infeed current out of a plurality of reference values matched with a corresponding plurality of locations, based on the location signal.

In an embodiment, the controller receives a user selected operation-mode parameter. In an embodiment, the controller selects a predetermined setting for the compressor and for at least one of a condensing fan and an evaporating fan, out of a plurality of settings, based on the operation-mode parameter, as a function of the infeed current reference value (corresponding to the input data). In an embodiment, said settings include the speed of the compressor and the speed of at least one of the condensing fan and the evaporating fan.

The operation-mode parameter is representative of an operation mode selectable by the user, such for example a sleep-operation mode or a boost-operation mode. When the sleep operation mode is selected, the controller selects predetermined settings out of said plurality of settings, in order to minimize the noise emitted by the condensing fan and the evaporating fan. When the boost operation mode is selected, the controller selects predetermined settings out of said plurality of predetermined settings, also over its nominal power, in order to maximize the power supplied to the compressor compatibly with the power supply from the campsite.

In an embodiment, the method comprises a step of receiving, at an electric supply component, an external power supply. The external power supply could be, for example the campsite power supply. In an embodiment, the external power supply has an alternate voltage in the range between 85 and 265 V. In an embodiment, the external power supply has a frequency of 50 Hz. In an embodiment, the external power supply has a frequency of 60 Hz.

In an embodiment, the method comprises a step of providing, through the electric supply component, a predetermined direct voltage at the output terminal, independent on frequency and amplitude of the voltage of the external power supply.

In an embodiment, the method comprises a step of feeding such a predetermined direct voltage to the electric motor of the compressor. In an embodiment, the method comprises a step of feeding such a predetermined direct voltage to the controller.

In an embodiment, the method comprises a step of feeding such a predetermined direct voltage to the electrical power unit, for powering the electric motor of the compressor.

In an embodiment, the method comprises a step of feeding such a predetermined direct voltage to the condensing fan. In an embodiment, the method comprises a step of feeding such a predetermined direct voltage to a converter for powering the condensing fan.

In an embodiment, the method comprises a step of feeding such a predetermined direct voltage to the evaporating fan. In an embodiment, the method comprises a step of feeding such a predetermined direct voltage to a converter for powering the evaporating fan.

The present description also covers a recreational vehicle.

In an embodiment, the recreational vehicle comprises said air conditioning apparatus.

In an embodiment, the recreational vehicle comprises a plurality of electrical appliances. Each electrical appliance is configured for absorbing a respective infeed electrical current.

In an embodiment, the recreational vehicle comprises an electrical power unit. The electrical power unit is configured to absorb an input electrical current or power and to generate one or more infeed electrical current for powering the respective electrical appliances.

The recreational vehicle comprises a controller. The controller, in an embodiment, is connected to the electrical power unit. The controller, in an embodiment, is adapted to receive input data representative of a reference value for the input electrical current or power. The controller, in an embodiment, is programmed to set the electrical power unit to generate one or more infeed voltages at corresponding reference amplitudes and/or frequencies for feeding the corresponding electrical appliances, so that the overall input electrical current or power absorbed by the electrical power unit is below said reference value.

In an embodiment, the controller is programmed to assign in an optimized way the available current or power to the electrical appliances of said plurality, responsive to predetermined logics. In an embodiment, the predetermined logics of assignment of the available current or power depend on a plurality of functions. In an embodiment, the plurality of functions is programmable by the user through an interface. In an embodiment, the plurality of functions is memorized in a programmable memory.

The plurality of electrical appliances may include one or more of the followings appliances: hair dryer, battery charger, fridge, kettle, toaster, vacuum cleaner, micro wave oven, boiler, electrical heater. In an embodiment, one electrical appliance of said plurality is an air conditioning apparatus.

BRIEF DESCRIPTION OF DRAWINGS

This and other features will become more apparent from the following detailed description of non-limiting example embodiments, with reference to the accompanying drawings, in which.

DETAILED DESCRIPTION

Figure 1:
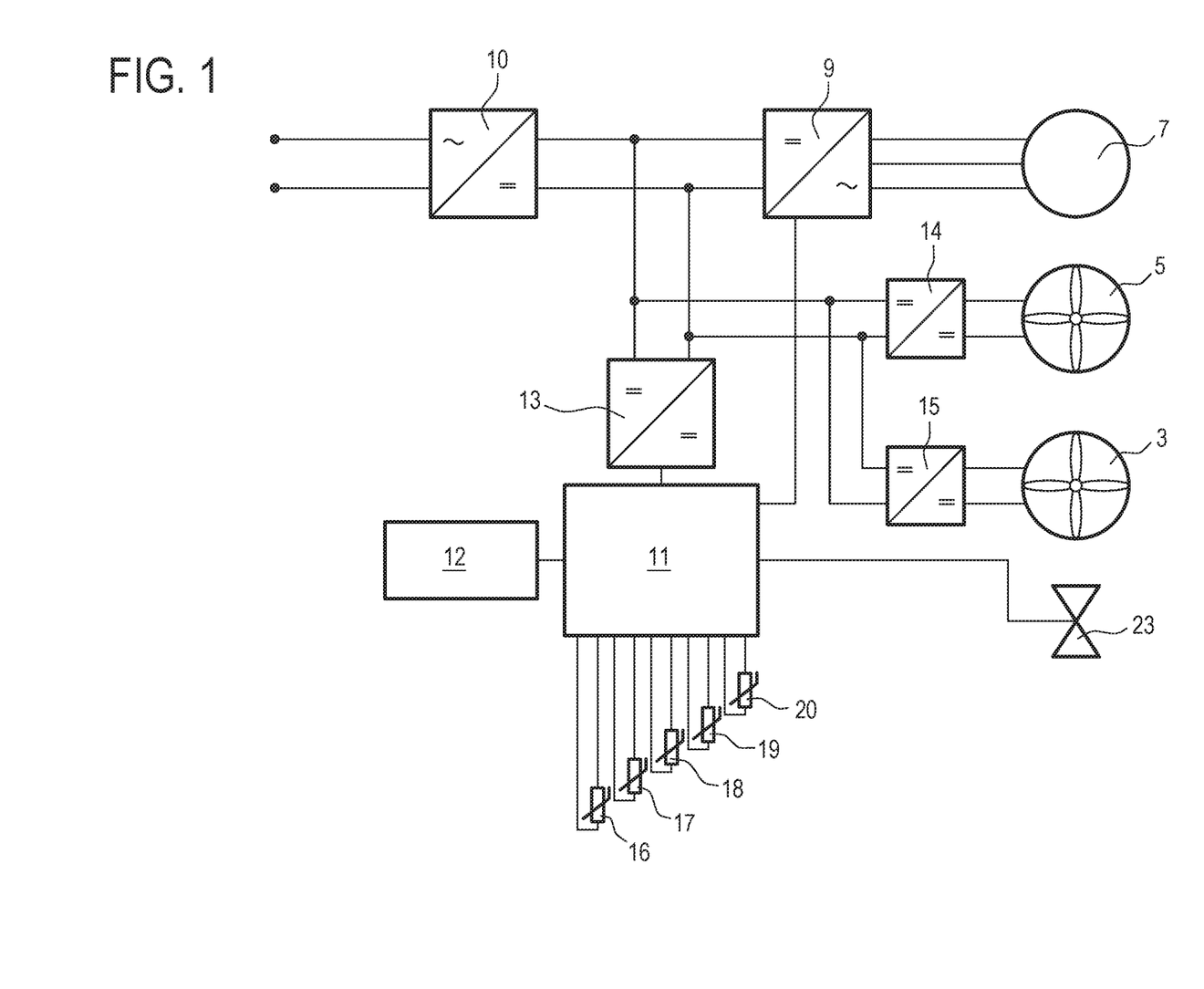
FIG. 1 illustrates an electric scheme of an air conditioning apparatus according to the present description.
Figure 2:
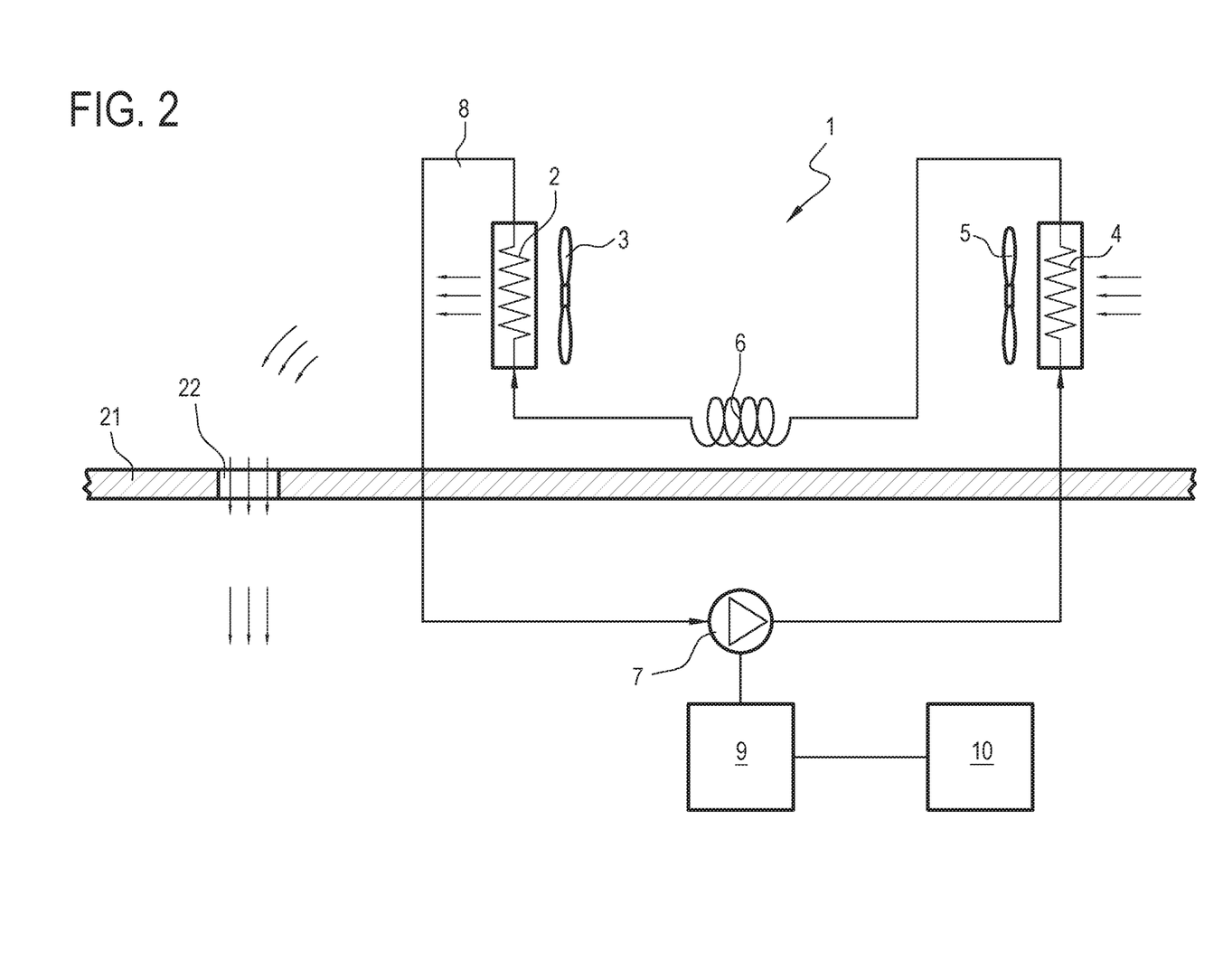
FIG. 2 shows the air conditioning apparatus of FIG. 1 in a schematic view.

With reference to the accompanying drawings, the numeral 1 denotes an air conditioning apparatus (in the following, an apparatus). According to one aspect of the present disclosure, the air conditioning apparatus 1 is self-contained.

The apparatus 1 comprises a cooling circuit 8. The cooling circuit 8 is designed for the circulation of a cooling fluid. In an embodiment, the cooling circuit 8 is a closed circuit.

The apparatus 1 comprises a first heat exchanger, which, in an embodiment, is an evaporator 2. The evaporator 2 is arranged in the path of the cooling fluid. The evaporator 2 is connected to the cooling circuit 8. The evaporator 2 is configured for exchanging heat between the cooling fluid and (external) air circulating there through; specifically, in the evaporator 2, the cooling fluid absorbs heat from the air, resulting in an evaporation of the cooling fluid itself.

In an embodiment, the apparatus 1 comprises an evaporating fan 3. The evaporating fan 3 is configured for circulating the air through the evaporator 2.

In an embodiment, the apparatus 1 comprises a second heat exchanger, which, in an embodiment, is a condenser 4. The condenser 4 is arranged in the path of the cooling fluid. The condenser 4 is connected to the cooling circuit 8. The condenser 4 is configured for exchanging heat between the cooling fluid and an (external) air circulating there through; specifically, in the condenser 4, the cooling fluid releases heat to the air, resulting in a condensation of the cooling fluid itself.

In an embodiment, the apparatus 1 comprises a condensing fan 5. The condensing fan 5 is configured for circulating the air through the condenser 4.

In an embodiment, the apparatus 1 comprises an expansion unit 6. In an embodiment, the expansion unit 6 is a capillary tube. In an embodiment, the expansion unit 6 is a throttling valve. In an embodiment, the expansion unit 6 thermal expansion valve. The expansion unit 6 is configured for decreasing a pressure of the cooling fluid circulating there through. The expansion unit 6 is connected to the cooling circuit 8. The expansion unit 6 is positioned in the path of the cooling fluid downstream the condenser 4 and upstream the evaporator 2.

In an embodiment, the apparatus 1 comprises a compressor 7. In an embodiment, the compressor 7 is a pump. The compressor 7 is configured for increasing a pressure of the cooling fluid passing there through; the compressor 7 is configured for circulating the cooling fluid in the cooling circuit 8. The compressor 7 is connected to the cooling circuit 8. The compressor 7 is positioned in the path of the cooling fluid downstream the evaporator 2 and upstream the condenser 4.

The compressor 7 includes an electric motor. The electric motor is powered with an infeed current.

The apparatus 1 comprises an electrical power unit, which in one embodiment is an inverter 9. The inverter 9 is configured for absorbing an input electrical current or power. The inverter 9 is configured for generating a variable infeed voltage. In an embodiment, the variable infeed voltage is an alternate voltage. The inverter in an embodiment has an output connected to the electric motor of the compressor 7, for powering the electric motor with an infeed current at the infeed voltage.

In an embodiment, the apparatus 1 comprises an electric supply component, which in one embodiment is a rectifier 10. The rectifier 10 has an input terminal, connectable to an external power supply. The rectifier 10 has an output terminal, connected to the inverter 9.

The rectifier 10 is configured to absorb at its input terminal an alternate voltage (from the external power supply), and to generate at its output terminal a predetermined direct voltage. The predetermined output voltage is independent on frequency and amplitude of the absorbed alternate voltage.

In an embodiment, the apparatus 1 comprises a controller 11. The controller 11 is connected to the inverter 9. The controller 11 is adapted to receive input data representative of a reference value for the input electrical power (at the input terminal of the rectifier 10). The controller 11 is programmed to set the inverter 9 to generate the infeed voltage at a reference amplitude and/or frequency, in dependence on the reference value for the input current (or power), so that the electrical current (or power) is below said reference value.

In an embodiment, the controller is programmed to drive the condensing fan 5 and the evaporating fan 3 as a function of the input data.

In an embodiment, the apparatus 1 comprises a first DC/DC converter 13. The first DC/DC converter 13 has an input terminal connected to the rectifier 10. The first DC/DC converter 13 has an output terminal connected to the controller 11.

In an embodiment, the apparatus 1 comprises a second DC/DC converter 14. The second DC/DC converter 14 has an input terminal connected to the rectifier 10. The second DC/DC converter 14 has an output terminal connected to the condensing fan 5.

In an embodiment, the apparatus 1 comprises a third DC/DC converter 15. The third DC/DC converter 15 has an input terminal connected to the rectifier 10. The third DC/DC converter 15 has an output terminal connected to the evaporating fan 4.

In an embodiment, the controller 11 is programmed to set the second DC/DC converter to generate a condensing fan infeed voltage in dependence on the input data (so that the overall input electrical current or power absorbed by the electrical power unit is below the reference value).

In an embodiment, the controller 11 is programmed to set the third DC/DC converter to generate an evaporating fan infeed voltage in dependence on the input data (so that the overall input electrical current or power absorbed by the electrical power unit is below the reference value).

In an embodiment, the apparatus 1 comprises an interface 12. The interface 12 is connected to the controller 11. The interface 12 is configured to enable a user to provide the input data (through the interface 12 itself).

In an embodiment, the interface 12 is configured to enable the user to provide a desired indoor temperature value.

In another embodiment, the apparatus comprises an additional interface (set point temperature interface) configured to enable the user to provide a desired indoor temperature value.

In an embodiment, the apparatus 1 comprises a plurality of sensors connected to the controller 11.

In an embodiment, the plurality of sensors includes a compressor temperature sensor 16. The compressor temperature 16 is configured to survey the temperature of the cooling fluid passing through the compressor 7 and to transmit to the controller 11 a signal representative of the temperature of the cooling fluid passing through the compressor 7.

In an embodiment, the plurality of sensors includes an outdoor temperature sensor 17. The outdoor temperature sensor 17, in an embodiment, is a thermometer. The outdoor temperature sensor is configured to measure the outdoor temperature and to transmit to the controller 11 a signal representative of the outdoor temperature.

In an embodiment, the plurality of sensors includes an indoor (room) temperature sensor 18. The indoor temperature sensor 18, in an embodiment, is a thermometer. The indoor temperature sensor is configured to measure the indoor temperature (inside the recreational vehicle) and to transmit to the controller 11 a signal representative of the indoor temperature.

In an embodiment, the plurality of sensors includes a condenser coil sensor 19. The condenser coil sensor 19 is configured to survey the temperature of the cooling fluid passing through the condenser 4 and to transmit to the controller a signal representative of the temperature of the cooling fluid passing through the condenser 4.

In an embodiment, the plurality of sensors includes an evaporator coil sensor 20. The evaporator coil sensor 20 is configured to survey the temperature of the cooling fluid passing through the evaporator 2 and to transmit to the controller a signal representative of the temperature of the cooling fluid passing through the evaporator 2.

In an embodiment, the apparatus 1 comprises a positioning device and a memory, containing a plurality of reference values matched with a corresponding plurality of locations. Preferably, the positioning device is a GPS positioning device (in the following also indicated as GPS).

In an embodiment, the GPS and the memory are connected to the controller 11. In an embodiment, the controller is adapted to receive a location signal from the GPS and to set as the input data one of the reference values present in the memory, as a function of the location signal.

In an embodiment, the apparatus 1 comprises a wireless signal receiver, connected to the controller 11 for transmitting the input data. In an embodiment, the interface 12 is connected to the controller 11 via wireless. In an embodiment, the GPS and the memory are connected to the controller 11.

In an embodiment, the memory contains, for each value of a plurality of reference values for the infeed current (depending on the external electric supply), a corresponding plurality of predetermined settings for the compressor 7, for the condensing fan 5 and for the evaporating fan 3. In an embodiment, the controller 11 is programmed to receive a user selected operation-mode parameter and to select, for each reference value, one setting out of said plurality of predetermined settings, as a function of the operation-mode parameter. The operation-mode parameter is, for example, a silent mode parameter, to minimize the noise emitted by the apparatus 1, or a boost-mode parameter, to maximize the power of the compressor 7.

In an embodiment, the memory contains, for each value of the plurality of reference values for the infeed current, at least a first setting, corresponding to a first speed of the compressor 7 and of the at least one of the condensing fan 5 and the evaporating fan 3, and a second setting, corresponding to a second speed of the compressor 7 and of the at least one of the condensing fan 5 and the evaporating fan 3. In an embodiment, the second speed is higher than then first speed.

In an embodiment, the memory is programmable. In an embodiment, the input data are predetermined and memorized in the memory.

In an embodiment, the air conditioning apparatus 1 is a reversible heat pump. In an embodiment, the apparatus is suitable both for air cooling and heating. In an embodiment, the apparatus 1 comprises a four-way valve 23. The four-way valve 23 is configured for changing the direction of the cooling fluid flow in the cooling circuit. Through changing the direction of the cooling fluid flow, it is possible to change from cooling mode to heating mode and vice versa. On one hand, in the cooling mode, the cooling fluid out the compressor 7 is directed to the second heat exchanger (that in this embodiment is the condenser 4), where it releases heat to the external environment; therefore, the cooling fluid out the second heat exchanger is directed to the expansion unit 6, and after having expanded in the expansion unit 6 it is directed to the first heat exchanger (that in this embodiment is the evaporator 2), when it absorbs heat form an external air, thus providing fresh air for air conditioning; finally, the cooling fluid out the first heat exchanger is directed again to the compressor 7. On the other hand, in the heating mode, the cooling fluid out the compressor is directed to the first heat exchanger (that in this embodiment is a condenser), where it releases heat to an air which is then directed inside the caravan for heating purposes; therefore, the cooling fluid out the first heat exchanger passes through the expansion unit 6; after that, it is directed to the second heat exchanger (that in this embodiment is an evaporator), where it absorbs heat from an external air; finally, the cooling fluid out the second heat exchanger is directed again to the compressor 7.

In an embodiment, the electric supply component has an output connected to the four-way valve 23. In an embodiment, the rectifier 10 has an output connected to the four way-valve 23, for powering the four-way valve with a direct current.

The present description also covers a recreational vehicle comprising the air conditioning apparatus 1.

In an embodiment, the apparatus 1 is placed on top of the roof 21 of the recreational vehicle. In an embodiment, the apparatus 1 is integrated with the roof 21 of the recreational vehicle; specifically, the compressor 7 including the electric motor, the inverter 9 and the rectifier 10 are positioned under the roof 21, in order to stay safe from the rain and the weathering, while the condenser 4 and the evaporator 2 are positioned over the roof 21, in order to have a heat exchange with the external air. The external air which is cooled in the evaporator 2 is then introduce inside the recreational vehicle through an air-conditioned entrance 22.

In an embodiment, the recreational vehicle comprises a plurality of electrical appliances, such as a fridge, an electric oven, a microwave oven, an electric boiler, an electrical heater having an electric resistance. In an embodiment, one electrical appliance of said plurality is an air conditioning apparatus 1. Each electrical appliance is configured for absorbing a respective infeed electric current.

In an embodiment, the recreational vehicle comprises an electrical power unit. The electrical power unit is configured to absorb an input electrical current or power and to generate one or more infeed electrical current, each one for powering a respective electrical appliance.

In an embodiment, the recreational vehicle comprises a controller 11. The controller 11 is connected to the electrical power unit.

In an embodiment, the recreational vehicle comprises a plurality of sensors. The plurality of sensors is connected to the controller 11, for transmitting a plurality of signals representative of one or more of the following parameters: outdoor temperature, indoor temperature, evaporator coil temperature, condenser coil temperature, compressor temperature.

In an embodiment, in an embodiment, the controller 11 is adapted to receive input data representative of a reference value for the input electrical current or power.

In an embodiment, the controller 11 is adapted to receive the plurality of signals from the plurality of sensors.

In an embodiment, the controller 11 is programmed to set the electrical power unit to generate one or more infeed voltages at corresponding reference amplitude and/or frequency for feeding the corresponding electrical appliances, so that the overall input electrical current or power absorbed by the electrical power unit is below said reference value.

The present description also covers a method for supplying conditioned air in a recreational vehicle.

The method includes a step of circulating a cooling fluid in a cooling circuit 8 by means of a compressor 7. The compressor 7 includes an electric motor.

The method includes a step of exchanging heat between the cooling fluid and air. In an embodiment, the step of exchanging heat includes a cooling of the cooling fluid in a condenser 4, though a heating of the air passing there through. The air passes through condenser 4 ventilated by a condensing fan 5. In an embodiment, the step of exchanging heat includes a heating of the cooling fluid in an evaporator 2, though a cooling down of the air passing there through. The air passes through the evaporator 2 ventilated by an evaporating fan 3.

The air, after passing through the evaporator 2, becomes air conditioned. In an embodiment, the method comprises a step of introducing the air conditioned in the recreational vehicle, through an air-conditioned entrance 22.

The method comprises a step of generating a variable voltage. The variable voltage, in an embodiment, is an alternate voltage. In an embodiment, the alternate voltage is generated by means of an inverter 9, fed with an input current or power, for powering the electric motor with an infeed electrical current.

In an embodiment, a controller 11 sets the inverter 9 to generate the alternate variable voltage at a reference amplitude and/or frequency, so that the absorbed input current or power is below a reference value, in response to input data accessible from the controller 11.

In an embodiment, the method comprises a step of providing the input data through an interface 12 operable by a user. In an embodiment, the interface 12 transmits the input data to the controller 11.

In an embodiment, the controller 11 receives the input data through a wireless signal, received at a receiver (which is connected to the controller 11).

In an embodiment, the controller 11 receives a location signal (in an embodiment, via wireless) from a GPS and selects a reference value for the infeed current out of a plurality of values matched with a corresponding plurality of locations, based on the location signal.

In an embodiment, the controller 11 receives a user selected operation-mode parameter. In an embodiment, the operation-mode parameter is set by the user through the interface 12. In an embodiment, the controller 11, as a function of the infeed current reference value corresponding to the input data, selects a predetermined setting for the compressor 7, the condensing fan 5 and an evaporating fan 3, out of a plurality of settings, based on the operation-mode parameter. In an embodiment, said settings include the speed of the compressor 7, the speed of the condensing fan 5 and the speed of the evaporating fan 3.

In an embodiment, the method comprises a step of receiving, at a rectifier 10, an external power supply.

In an embodiment, the method comprises a step of providing, through the rectifier 10, a predetermined direct voltage at its output terminal, independent on frequency and amplitude of the voltage of the external power supply.

In an embodiment, the method comprises a step of feeding such a predetermined direct voltage to the electric motor of the compressor 7 and to the controller 11.

In an embodiment, the method comprises a step of feeding such a predetermined direct voltage to a first DC/DC converter 13, connected to the controller 11 for powering the controller 11.

In an embodiment, the method comprises a step of feeding such a predetermined direct voltage to a second DC/DC converter 14, for powering the condensing fan 5.

In an embodiment, the method comprises a step of feeding such a predetermined direct voltage to a third DC/DC converter 15, for powering the evaporating fan 3.

In an embodiment, the rectifier 10 has an output connected to the inverter 9.

In an embodiment, the rectifier 10 has an output connected to the first DC/DC converter 13.

In an embodiment, the rectifier 10 has an output connected to the second DC/DC converter 14.

In an embodiment, the rectifier 10 has an output connected to the third DC/DC converter 15.

In an embodiment, the rectifier 10 has an output connected to one or more additional electric supply components, which feed one or more electrical appliances of the recreational vehicle.

The invention claimed is:

1. An air conditioning apparatus for recreational vehicles, comprising:
   at least a first heat exchanger for exchanging heat with air circulating there through;
   a cooling circuit for a cooling fluid, having a path that passes through said first heat exchanger;
   a compressor including an electric motor, for circulating the cooling fluid in the cooling circuit;
   an electrical power unit connectable to an external power supply to absorb an input electrical current or power and to generate a variable infeed voltage, for powering the electric motor with an infeed electrical current,
   characterized in that the air conditioning apparatus comprises a controller connected to the electrical power unit, adapted to receive input data representative of a reference value for the input electrical current or power, and programmed to set the electrical power unit to generate the variable infeed voltage at a reference amplitude and/or frequency, so that the input electrical current or power is below said reference value;
   a positioning device, configured for determining a position of the air conditioning apparatus, and
   a memory, containing a plurality of reference values matched with a corresponding plurality of locations, wherein the controller is adapted to receive a location signal from the positioning device and to set as the input data one of the reference values present in the memory, as a function of the location signal.

2. The air conditioning apparatus of claim 1, comprising an interface connected to the controller, to enable a user to provide the input data through the interface.

3. The air conditioning apparatus of claim 1, wherein the positioning device includes a global positioning system (GPS).

4. The air conditioning apparatus according to claim 1, comprising a signal receiver, connected to the controller for transmitting the input data.

5. The air conditioning apparatus of claim 4, wherein the signal receiver is a wireless signal receiver.

6. The air conditioning apparatus according to claim 1, including at least one of a condensing fan and an evaporating fan operatively active on the air circulating through the first heat exchanger, wherein the controller is programmed to drive at least one of the condensing fan and the evaporating fan, as a function of the input data.

7. The air conditioning apparatus according claim 6, including said memory containing, for each value of the plurality of reference values for the infeed electrical current, a corresponding plurality of predetermined settings for the compressor and for at least one of the condensing fan and the evaporating fan, wherein the controller is programmed to receive a user selected operation-mode parameter, and to select, for each said plurality of reference values, one setting out of said corresponding plurality of predetermined settings, as a function of the user selected operation-mode parameter.

8. The air conditioning apparatus according to claim 7, wherein the memory contains, for each value of the plurality of reference values for the infeed electrical current, at least a first setting, corresponding to a first speed of the compressor and of the at least one of the condensing fan and the evaporating fan, and a second setting, corresponding to a second speed of the compressor and of the at least one of the condensing fan and the evaporating fan, wherein the second speed is higher than the first speed.

9. The air conditioning apparatus according to claim 1, comprising an electric supply component having an input terminal, connectable to an external power supply, and an output terminal, connected to the electrical power unit and to the controller, and configured to generate a predetermined direct voltage at the output terminal, independently on frequency and amplitude of a voltage of the external power supply.

10. The air conditioning apparatus according to claim 1, comprising a programmable memory, wherein the input data is predetermined and memorized in said programmable memory.

11. The air conditioning apparatus according to claim 1, including:
    a second heat exchanger, arranged in the path of the cooling fluid;
    an evaporating fan and a condensing fan, for circulating said air through the first and the second heat exchanger, respectively.

12. A method for supplying conditioned air in a recreational vehicle, comprising the following steps:
    circulating a cooling fluid by means of a compressor which includes an electric motor;
    exchanging heat between the cooling fluid and air;
    generating a variable voltage, by an electrical power unit fed with an input current or power, for powering the electric motor with an infeed electrical current, characterized in that a controller sets the electrical power unit to generate the variable voltage at a reference amplitude and/or frequency selected so that the absorbed input current or power is below a reference value, in response to input data accessible from the controller;
    receiving, at an electric supply component, an external power supply;
    providing, through the electric supply component, a predetermined direct voltage at an output terminal, independent on frequency and amplitude of the variable voltage of the external power supply;
    feeding such predetermined direct voltage to the electric motor of the compressor and to the controller.

13. The method of claim 12, further comprising the controller receiving the input data through an interface operable by a user, and/or through a wireless signal received at a receiver.

14. The method of claim 12, further comprising the controller receiving a location signal from a GPS and select a reference value for the infeed electrical current out of a plurality of reference values matched with a corresponding plurality of locations, based on the location signal.

15. The method of claim 12, further comprising the controller receiving a user selected operation-mode parameter, and, as a function of the infeed electrical current reference value corresponding to the input data, selecting a predetermined setting for the compressor and for at least one of a condensing fan and an evaporating fan, out of a plurality of settings, based on the user selected operation-mode parameter, wherein said settings include speed of the compressor and of at least one of the condensing fan and the evaporating fan.

16. An air conditioning apparatus for recreational vehicles, comprising:
- at least a first heat exchanger for exchanging heat with air circulating there through;
- a cooling circuit for a cooling fluid, having a path that passes through said first heat exchanger;
- a compressor including an electric motor, for circulating the cooling fluid in the cooling circuit;
- an electrical power unit connectable to an external power supply to absorb an input electrical current or power and to generate a variable infeed voltage, for powering the electric motor with an infeed electrical current;
- characterized in that the air conditioning apparatus comprises a controller connected to the electrical power unit, adapted to receive input data representative of a reference value for the input electrical current or power, and programmed to set the electrical power unit to generate the variable infeed voltage at a reference amplitude and/or frequency, so that the input electrical current or power is below said reference value;
- at least one of a condensing fan and an evaporating fan operatively active on the air circulating through the first heat exchanger, wherein the controller is programmed to drive at least one of the condensing fan and the evaporating fan, as a function of the input data;
- a memory containing, for each value of a plurality of reference values for the infeed electrical current, a corresponding plurality of predetermined settings for the compressor and for at least one of the condensing fan and the evaporating fan, wherein the controller is programmed to receive a user selected operation-mode parameter, and to select, for each said reference value, one setting out of said corresponding plurality of predetermined settings, as a function of the user selected operation-mode parameter.

17. An air conditioning apparatus for recreational vehicles, comprising:
- at least a first heat exchanger for exchanging heat with air circulating there through;
- a cooling circuit for a cooling fluid, having a path that passes through said first heat exchanger;
- a compressor including an electric motor, for circulating the cooling fluid in the cooling circuit;
- an electrical power unit connectable to an external power supply to absorb an input electrical current or power and to generate a variable infeed voltage, for powering the electric motor with an infeed electrical current;
- characterized in that the air conditioning apparatus comprises a controller connected to the electrical power unit, adapted to receive input data representative of a reference value for the input electrical current or power, and programmed to set the electrical power unit to generate the variable infeed voltage at a reference amplitude and/or frequency, so that the input electrical current or power is below said reference value;
- a programmable memory, wherein the input data is predetermined and memorized in said programmable memory.

18. A method for supplying conditioned air in a recreational vehicle, comprising the following steps:
- circulating a cooling fluid by means of a compressor which includes an electric motor;
- exchanging heat between the cooling fluid and air;
- generating a variable voltage, by an electrical power unit fed with an input current or power, for powering the electric motor with an infeed electrical current, characterized in that a controller sets the electrical power unit to generate the variable voltage at a reference amplitude and/or frequency selected so that the absorbed input current or power is below a reference value, in response to input data accessible from the controller;
- further comprising the controller receiving a location signal from a GPS and selects a reference value for the infeed electrical current out of a plurality of reference values matched with a corresponding plurality of locations, based on the location signal.

19. The method of claim 18, further comprising the steps of:
- receiving, at an electric supply component, an external power supply;
- providing, through the electric supply component, a predetermined direct voltage at an output terminal, independent on frequency and amplitude of voltage of the external power supply;
- feeding such predetermined direct voltage to the electric motor of the compressor and to the controller.

* * * * *